July 29, 1969 E. D. BURQUEZ 3,458,667

METHOD OF USING AN ENDLESS RECORDING TAPE

Filed Jan. 18, 1965

INVENTOR
EDWARD D. BURQUEZ

BY Newton, Hopkins & Jones

ATTORNEY

United States Patent Office
3,458,667
Patented July 29, 1969

3,458,667
METHOD OF USING AN ENDLESS RECORDING TAPE

Edward D. Burquez, Atlanta, Ga., assignor of one-half to William R. Murray III, Atlanta, Ga.
Filed Jan. 18, 1965, Ser. No. 426,213
Int. Cl. G11b 5/02
U.S. Cl. 179—100.2 2 Claims

ABSTRACT OF THE DISCLOSURE

A method of imposing signals on an endless magnetic recording tape and a method of reproducing signals from an endless magnetic recording tape wherein the method of imposing signals on a magnetic recording tape includes the step of imposing at least two signals on one surface of an endless magnetic recording tape wherein the signals recorded have different base signal magnitudes. The method of reproducing the signals from an endless magnetic recording tape which has at least two signals imposed on one side thereof comprises the steps of reproducing one of the signals from that side of the magnetic tape on which it is imposed and reproducing the other of the signals from the opposite side of the magnetic tape on which the signal is imposed. Also included is the method of reproducing signals from an endless magnetic recording tape in which a plurality of signals are imposed across the width of the tape along its length which comprises the steps of reproducing a first signal from substantially the entire length of the tape with a receiving head, turning the tape over and reproducing a second said signal with the receiving head from substantially the entire length of the tape, turning the tape over and reproducing a third signal with a second receiving head or with the first receiving head in a second position from substantially the entire length of the tape, turning the tape over and reproducing a fourth signal with the second receiving head or with the first receiving head in a second position from substantially the entire length of the tape.

The present invention relates reels of magnetic recording tape for tape recording machines, and more particularly to a method and apparatus for recording sound that effectually doubles, or quadruples, the effective surface of a magnetic recording tape so that twice or four times as much sound can be recorded on a single length of tape.

Recently, a market has been developed for recorded music and advertisements in department stores, restaurants, etc. While the music and other recorded material is desired in the store, management has been hesitant to delegate the responsibility of operating a music producing instrument to an employee if a substantial amount of the employee's time is involved. To overcome this problem the so-called "endless" magnetic recording tape has been developed whereby the ends of a tape are connected together so that the tape effectively has no end. Such a tape was wound onto a reel and threaded into a tape recorder so that the recorder pulled the tape next to be played from the center of the reel and fed the most recently played tape back to the periphery of the same reel. As more tape was pulled from the center of the reel and more tape was fed to the periphery of the reel the tape would slip and slide with respect to itself so that the tape near the outer portion of the reel would slip or shrink toward the center of the reel and the reel would maintain its original size. With this arrangement it can be seen that the information recorded on the tape would be played continually over and over again so that the recording machine could be cut on and operated continuously for an extended period of time, or indefinitely. While tapes of this type generally fulfill their purpose, many situations dictate that the information on the tape not be repeated at frequent intervals. In order to cope with this problem, the "endless" tapes were made longer so that more information could be recorded thereon; however, it has been found that making the tape longer and consequently, the reel larger, has its practical limits such that a tape can be made only so long before it becomes too cumbersome and easily entangled. Also, in a long reel of endless tape there is an excessive amount of relative movement of the tape with itself during movement of a portion of the tape from the periphery of the reel toward its center so that the information on the tape becomes worn and distorted and the tape itself becomes rapidly worn. Furthermore, with an "endless" tape reel there is relative motion of the tape on the reel with itself whenever the tape is being played, regardless of the length of the tape. Accordingly, it can be seen that the information on the tape will become distorted due to relative motion of the tape with itself just as rapidly on a long tape as on a short tape. Thus, lengthening the tape does not prolong its life.

Accordingly, the present invention provides a method of recording and sequentially playing back a plurality of signals imposed on one length of tape which effectively increases the playing time of the tape.

Therefore it is an object of this invention to provide a method of recording on an "endless" tape so that the effective length of the tape is doubled.

Another object of this invention is to provide a tape which is divided into two channels and constructed in such a manner that a conventional recorder will play the two channels sequentially.

Another object of my invention is to provide an "endless" tape for a tape recorder that is divided into at least two channels that are recorded on one side of the tape such that one channel is listened to from the side on which it was recorded and another channel is subsequently listened to through the tape from the opposite side on which it was recorded.

Numerous other objects, features and advantages of the present invention will be apparent from consideration of the following specification, taken in conjunction with the accompanying drawings, in which.

Figure 1:
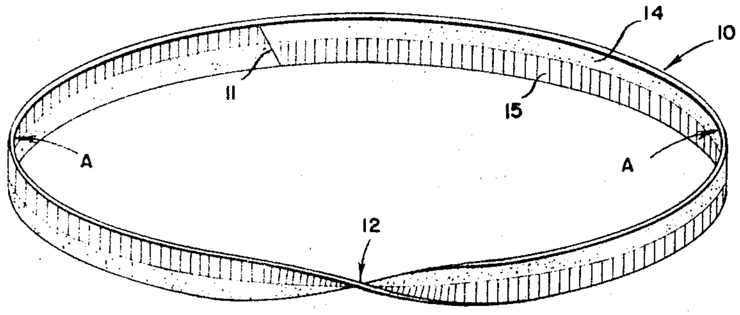
FIG. 1 is a perspective view of a tape having its ends spliced together 180 degrees out of phase.

Referring now more particularly to the drawings, FIG. 1 shows a magnetic recording tape 10 that has been joined together at its ends at 11 such that the tape is an "endless" tape. Before joining the tape together at its ends, the tape is twisted 180 degrees so that after the ends are joined together a twist 12 will appear in the tape. In this manner, a Mobius surface is formed such that if one surface of the tape is followed around its entire length the opposite surface will automatically begin to be followed when crossing over the spliced portion 11 of the tape. In this manner it can be seen that the Mobius tape has only one effective surface in that when an object travels the entire length of one surface of the tape it will find itself on the opposite side of the tape from which it started and will have to travel the entire length of the tape again before it reaches its point of origin. This phenomenon can be traced by starting at point A on the tape of FIG. 1. Traveling clockwise from point A it can be seen that the tape reverses itself at the twist 12. Thus, where the object following the tape started on the inside of the tape it begins to follow the outside of the tape after it traverses the twisted portion. Continuing on clockwise around the point of origin it can be seen that the object following the surface of the tape would pass point A on the outside surface of the tape, and would have to travel the entire length of the tape again and pass over the twisted portion 12 to get back to the inside surface of the tape to return to point A. With this arrangement, it can be seen that an object can travel twice the length of the tape without traveling twice over any portion of the tape and without readjusting or repositioning the object traveling over the surface of the tape. Thus, it can be seen that the effective length of one surface of the tape is doubled.

The normal magnetic recording tape of the type commonly used in recording machines is very thin and usually composed of Mylar, or a similar plastic surface, which is glossy on one side and coated with an iron oxide on the other side, which provides a rather dull finish. A conventional method of recording on a magnetic recording tape is to magnetize certain portions of the iron oxide coating on the tape. Because recording tapes of this type are very thin, the tape itself offers little resistance or shielding of the magnetized iron oxide so that the signal imposed on the iron oxide can be "read" from either side of the tape. Of course, reading the signal through the tape causes a slight decrease in volume from the receiver as compared to reading the signal from the surface of the tape. Thus, recording a signal over the whole width of a twisted, or Mobius-type tape would accomplish only having the tape signal reproduced at a higher volume on the recorder during one revolution of the tape and at a lower volume during the subsequent revolution of the tape.

However, if the twist tape is divided into two parallel strips such as 14 and 15, it can be seen that an object starting at point A on the inside of the upper portion of the tape, and then moving clockwise around the tape, will travel through the twisted portion 12 of the tape so that it *reverts* from the upper inside portion to the lower outside portion, and will remain on this portion through the spliced portion of the tape until it again crosses the twisted portion of the tape whereupon it will revert from the lower outside surface of the tape back again to the upper inside portion. Thus, it can be seen that if two signals are imposed on one surface of the tape, one signal on the upper portion and the other signal on the lower portion, an object starting out at point A on one portion of the tape will travel over each of the signals consecutively so that twice the length of the tape will be traveled without repetition of any signal.

By arranging a tape in this manner it can be seen that a tape having a length which would normally provide a certain length of time of recorded matter will provide double the time normally provided.

Figure 2:
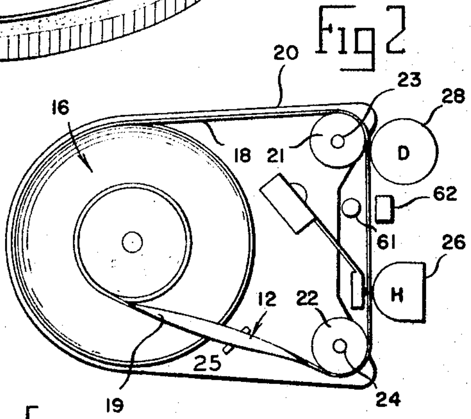
FIG. 2 is a plan view of an "endless" magnetic recording tape wound on a reel, housed in a casing, and inserted on a conventional recording machine.

In order that an extended length of tape of this type can be conveniently used, it has been found that it is expedient to reel the tape onto a reel such as that shown at 16 of FIG. 2. The tape is reeled onto the reel 16 in the conventional manner and the tape 18 at the periphery of the wheel is joined to that portion 19 at the center of the reel with a 180 degree twist in the tape, so that the backside or glossy side of the tape is joined together with the front side or dull side of the tape. The reel 16 is housed in a casing 20 usually composed of plastic or other similar material that is transparent. The casing 20 has a pair of spindles 21 and 22 which rotate about their axles 23 and 24 respectively.

The tape is threaded around the spindle in such a manner that the tape, in its normal path of travel, travels from the center portion of the reel 16 around the spindle 22, around the spindle 21 and back to the periphery of the reel. When the tape is pulled from the center of the reel at 19 it tends to twist approximately 90 degrees so that it lies substantially flat over the body of the rotating reel. Because of this phenomenon it becomes expedient to elevate the tape as it is pulled from the center of the reel so that it does not rub against the reel and twist the tape the remainder of its 180 degrees before it contacts the spindle 22. For this purpose a guide bar 25 is inserted in the path of the tape so that when the tape is pulled from the center of the reel at 19, it is lifted over the body of the rotating reel and will be urged to lie flat over the surface of the guide bar 25. Since the surface of the spindle 22 over which the tape travels is disposed at an angle 90 degrees with respect to the guide bar 25 the tape will continue to twist the remaining 90 degrees of its 180 degree twist after it leaves the suface of the guide bar 25 and just before it reaches the surface of the spindle 22. With this arrangement, it can be seen that the tape is disposed in an untwisted configuration between the spindles 21 and 22 so that a recording head such as head 26 can be disposed between the spindles. Also, in order that motion be imparted to the tape a drive wheel 28 frictionally engages the spindle 21 with the tape passing therebetween so that rotation of the drive wheel rotates the spindle 21 and urges that the tape pass therebetween.

In this manner the tape will be pulled from the center of the reel 16, over the guide bar 25, around the spindle 22, past the head 26, and head back toward the periphery of the reel 16.

Figure 3:
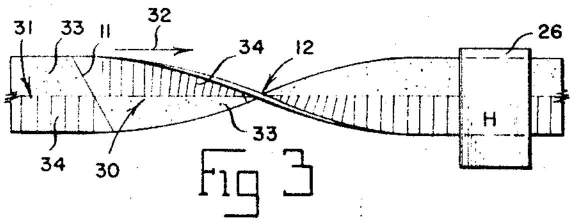
FIG. 3 is an elevational view of a portion of the tape showing the twist in the tape.
Figures 4, 5, 6, 7:
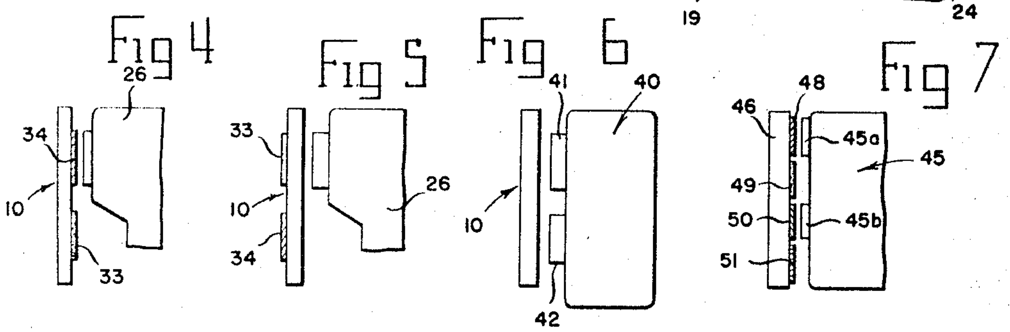
FIG. 4 is an elevational view, partially in cross section, of a tape and a recording head, which illustrates the method in which the head reads from the glossy side of the tape.
FIG. 5 is an elevational view of a tape and a recording head, similar to FIG. 4, but showing the method in which head reads through the tape.
FIG. 6 is an elevational view of a tape and a recording head, similar to FIGS. 4 and 5, but showing the method in which the two channels are recorded onto the surface of tape.
FIG. 7 is an elevational view partially in cross section of a tape and a head, similar to FIG. 4, but showing a method of receiving two signals simultaneously from one side of one tape.

Referring now to FIGS. 3, 4 and 5, it can be seen that the head 26 will always read through the tape to receive one signal, and will always read from the surface of the tape to receive the other signal. As seen in FIG. 3 the surface of the tape 30 which is coated with the iron oxide is joined together at the splice 11 with the uncoated or glossy surface 31. With the tape traveling in the direction represented by the arrow 32 the tape will be twisted at 12 so that the head 26 will read through the tape to receive the signal 33 imposed on the surface 30 of the tape. However, when the splice 11 travels past the head 26 the side of the tape 30 coated with the iron oxide will be closest to the head so that the head will read from the surface of the tape. Thus, if both signals 33 and 34 are imposed onto the surface of the tape with the same magnitude it can be seen that when the head is reading through the tape it would read a slightly weaker signal due to the interference of the tape itself between the magnitized iron oxide and the head. However, since the head always reads the same signal through the tape, the signal to be read through the tape can be imposed onto the surface of the tape with a greater magnitude, for instance, at a magnitude of minus 6 decibels as compared with zero decibels for the other half of the tape so that it might be more readily received by the head. In this manner the head will receive both signals with approximately the same degree of magnitude and no difference in volume will be detected or have to be compensated for in the playback machine.

In order that the two signals be imposed onto one surface of the tape at different magnitudes a split or double head as shown in FIG. 6 can be employed. The double head 40 has an upper portion 41 and a lower portion 42 for magnetizing the iron oxide on the surface of the tape. Of course, the signal which is to be stronger must be predetermined so that either the upper or lower heads 41 and 42 can be energized to a greater degree so as to impose a stronger signal on the surface of the tape. In this manner a length of tape can have two signals unequal in magnitude imposed on one of its surfaces and then be joined together at its ends with a 180 degree twist.

Figures 8, 9:
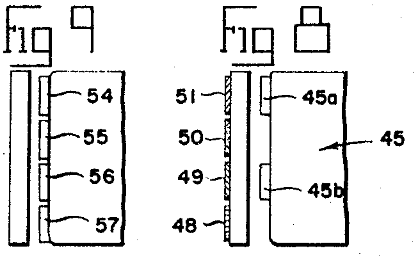
FIG. 8 is an elevational view partially in cross section of a tape and a head, similar to FIG. 7, but showing a method in which two signals are read through the tape.
FIG. 9 is an elevational view partially in cross section of a tape and a head, similar to FIG. 7, but showing a method of recording a plurality of signals on one side of the tape.

While this invention has been disclosed as comprising a tape which reproduces monaural sound for a time which is double the effective length of the tape, it should be understood that the principles involved are also adaptable to stereophonic sound and also for more than doubling the effective length of the tape. For instance, FIG. 7 shows a split head 45 and a tape 46 having four channels, 48, 49, 50, and 51 thereon. With this arrangement it can be seen that the upper head 45*a* will reproduce the signal imposed on channel 48 while the head 45*b* will reproduce the signal imposed on channel 50. These signals can be read simultaneously from the tape so that they can be reproduced separately to create a sound separation of substantially the same sound source so as to broadcast "stereophonic" sound. While the tape is traveling past the head 45 as shown in FIG. 7 it can be seen that the signals 49 and 51 will not be reproduced by the head. However, when the tape is twisted, as described above, it can be seen that a subsequent passage of the tape over the head will reverse the surface of the tape as shown in FIG. 8 so that the signals 49 and 51, which were previously described so that no difference in volume in the reproducing system will be noted. In order to accomplish this, the signals 49 and 51 will be imposed on the surface of the tape by the heads 55 and 57 at a stronger level than the signals 48 and 50 by heads 54 and 56, as shown in FIG. 9. After the heads 54, 55, 56 and 57 impose a signal on the surface of the tape, the tape can be fed onto a reel such as that shown in FIG. 2, twisted, and spliced together at its ends as previously described. In this manner, the tape will reproduce stereophonic sound for a length of time that would normally amount to twice the length of the tape.

If it is desired to impose information of long duration on a short tape, an arrangement similar to that shown in FIGS. 7, 8 and 9 can be utilized. With the apparatus shown in FIGS. 7 and 8 the four signals imposed on the surface of the tape can be read consecutively by having the head 45*a* read the signal 48 and then signal 51, and then having the head 45*b* read the signal 50 and then the signal 49. Of course, this would require a means for switching back and forth between the heads 45*a* and 45*b*.

Figures 10, 11:
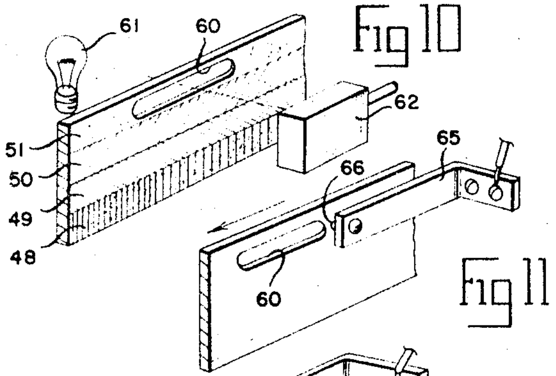
FIG. 10 is a perspective view of a portion of the tape showing a method of switching from one recording head to another recording head with the use of a photo-sensitive mechanism.
FIG. 11 is a perspective view of a portion of the tape, similar to FIG. 10, showing a method of switching from one recording head to another recording head by the use of a contact which is grounded through a hole in the recording tape.

Several successful means for switching heads can be utilized with this device. FIG. 10 shows a magnetic recording tape 10 with a translucent space or hole 60 cut close to one edge of the tape. A light source 61 is positioned on one side of the tape and a photoelectric cell 62 is positioned on the other side of the tape. When the hole 60 in the tape passes between the light and the photoelectric cell the light will pass through the hole and energize the photoelectric cell. When the photoelectric cell is energized a relay (not shown) is tripped and the receiver of the tape recorder is switched from one head to the other head, i.e., from head 45*a* to head 45*b*. As the tape progresses through the machine it can be seen that the next time hole 60 passes by the light source 61 and photoelectric cell 62 it will be in the lower half of the tape so that the light source will not reach the photoelectric cell and the head receiving the signal from the tape will continue to play. Only until the hole 60 passes again through the machine and the reel will it be in the proper position at the upper portion of the tape to allow the light source 61 to energize the photoelectric cell 62 to switch from one head to the other head, i.e., from head 45*b* back to head 45*a*.

A similar result can be attained by the use of a simple contact as shown in FIG. 11. Here, the hole 60 passes between the poles of a resilient switch such as the metal arm 65 which is composed of a resilient metal that is lightly urged towards the tape. When the hole passes between the projection 66 of the resilient metal arm 65 and its opposite contact on the other side of the tape (not shown) the projection 66 will come into contact with the other pole of its switch so that electrical contact is made and a remote relay switch will switch receiver heads.

Figure 12:
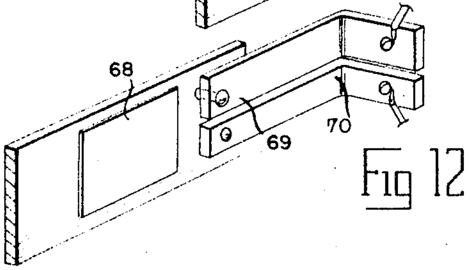
FIG. 12 is a perspective view of a portion of the tape, similar to FIG. 10, showing a method of switching from one recording head to another recording head by actuating an electrical contact with a metallic strip located in the recording tape.

Another method of switching heads is to coat a portion of the tape with metal foil as shown at 68 in FIG. 12. With this arrangement the metal foil 68 would pass over the electrical contacts 69 and 70 so that the metal foil would act to close a circuit between the two contacts and a remote relay switch would be actuated to shift heads.

As with the light and photoelectric cell shown in FIG. 10, it can be seen that the hole 60 of FIG. 11 will pass its related switch near the upper edge of the tape on one pass and near the lower edge of the tape away from the switches on the subsequent pass of the tape. Also, the metal foil of FIG. 12 will pass the contacts 69 and 70 on the inside of the tape on every other pass. By this arrangement the switches of FIGS. 11 and 12 would be actuated once every two passes of the tape through the recording device to switch receiving heads.

While these switching means have been disclosed as functioning to switch from one receiving head to another receiving head, it should be understood that these switches can also be utilized to position a single receiving head in alternate positions so that the single receiving head would be positioned in a position similar to that of head 45*a* of FIG. 7 until the associated switch was actuated by the recording tape whereupon the single receiving head would be moved to a position similar to that of head 45*b*. In this manner a single receiving head would function to sequentially reproduce four independent sound tracks on a single length of magnetic recording tape.

It will be obvious to those skilled in the art that many variations may be made in the embodiments chosen for the purpose of illustrating the present invention without departing from the scope thereof as defined by the appended claims.

I claim:

1. A method of reproducing signals from an endless recording tape having a plurality of signals imposed on one side of the tape across the width thereof along the length thereof, said method comprising reproducing a first signal with a first receiving head from substantially the entire length of said tape from the same side on which said signals are imposed, turning said tape over and reproducing a second signal with said first receiving head from substantially the entire length of said tape from the opposite side on which said signals are imposed, turning said tape over and reproducing a third signal with a second receiving head from substantially the entire length of said tape from the same side on which said signals are imposed, and turning said tape over and reproducing a fourth signal with said second receiving head from substantially the entire length of said tape from the opposite side on which said signals are imposed.

2. A method of reproducing signals from a recording tape having a first signal imposed on the uppermost portion of the width of the tape along its length, a second signal imposed on the lower center portion of the width of said tape, a third signal imposed on the upper center portion of the width of said tape and a fourth signal imposed on the lowermost portion of the width of the tape, and wherein all of said signals are imposed on the same side of the tape and said third and fourth signals have a different base signal magnitude from said first and second signals comprising the steps of: simultaneously reproducing the first and second signals, turning the tape over, and simultaneously reproducing the third and fourth signals wherein the first signals reproduced are reproduced from the side of the tape on which they are recorded and wherein the second signals reproduced are reproduced from the opposite side of the tape on which they were recorded.

References Cited

UNITED STATES PATENTS

| | | | |
|---|---|---|---|
| 2,586,666 | 2/1952 | Kuhlik | 274—11 |
| 2,647,750 | 8/1953 | Camras | 274—4 |
| 2,737,646 | 3/1956 | Muffly | 340—318 |
| 3,278,694 | 10/1966 | Pastor | 179—100.2 |

OTHER REFERENCES

New Product Report, July 1957, pp. 30–32, Hi Fi Tape Recording Magazine.

BERNARD KONICK, Primary Examiner

A. RUSSELL GOUDEAU, Assistant Examiner

U.S. Cl. X.R.

242—55.19